United States Patent
Morper et al.

(10) Patent No.: US 10,028,258 B2
(45) Date of Patent: Jul. 17, 2018

(54) METHOD OF MANAGING RESOURCES

(71) Applicant: NOKIA SOLUTIONS AND NETWORKS GMBH & CO. KG, Munich (DE)

(72) Inventors: Hans-Jochen Morper, Erdweg (DE); Christian Markwart, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 0 days.

(21) Appl. No.: 15/036,148

(22) PCT Filed: Nov. 14, 2013

(86) PCT No.: PCT/EP2013/073823
§ 371 (c)(1),
(2) Date: May 12, 2016

(87) PCT Pub. No.: WO2015/070909
PCT Pub. Date: May 21, 2015

(65) Prior Publication Data
US 2016/0295566 A1   Oct. 6, 2016

(51) Int. Cl.
*G01R 31/08* (2006.01)
*H04L 12/28* (2006.01)
(Continued)

(52) U.S. Cl.
CPC ....... *H04W 72/0406* (2013.01); *H04W 16/14* (2013.01); *H04W 72/04* (2013.01); *H04W 88/12* (2013.01)

(58) Field of Classification Search
CPC ......... H04W 72/0493; H04W 71/1236; H04W 72/1257; H04W 88/18; H04W 92/02
See application file for complete search history.

(56) References Cited

U.S. PATENT DOCUMENTS

2009/0164994 A1* 6/2009 Vasilevsky .......... G06F 9/45533
718/1
2010/0131650 A1* 5/2010 Pok ..................... H04L 41/0896
709/226

(Continued)

OTHER PUBLICATIONS

International Search Report & Written Opinion dated Aug. 7, 2014 corresponding to International Patent Application No. PCT/EP2013/073823.

Dejan Bojic et al., "Advanced Wireless and Optical Technologies for Small-Cell Mobile Backhaul with Dynamic Software-Defined Management," IEEE Communications Magazine, IEEE Service Center, vol. 51, No. 9, Sep. 1, 2013, XP011525704, pp. 86-93.

(Continued)

*Primary Examiner* — Diane Lo
*Assistant Examiner* — Abu-Sayeed Haque
(74) *Attorney, Agent, or Firm* — Squire Patton Boggs (US) LLP

(57) ABSTRACT

A resource controller for managing resources in a network and arranged at a site of a first network entity is provided, wherein the resource controller comprises: a database, adapted to store resource managing related information; an interface adapted to receive a resource managing message from a second network entity at the first network entity; and a resource managing unit, wherein the resource managing unit is adapted to grant access to the stored resource managing related information on the database based on the received resource managing message.

20 Claims, 8 Drawing Sheets

(51) Int. Cl.
*H04J 3/00* (2006.01)
*G06F 15/16* (2006.01)
*H04W 72/04* (2009.01)
*H04W 16/14* (2009.01)
*H04W 88/12* (2009.01)

(56) References Cited

U.S. PATENT DOCUMENTS

| | | | |
|---|---|---|---|
| 2011/0010351 A1* | 1/2011 | Szimmetat | G06F 17/30867 707/695 |
| 2011/0040812 A1* | 2/2011 | Phillips | G06F 9/45541 707/822 |
| 2011/0055299 A1* | 3/2011 | Phillips | G06F 9/45533 707/827 |
| 2012/0246008 A1* | 9/2012 | Hamilton, II | G06Q 30/02 705/14.66 |
| 2013/0111468 A1* | 5/2013 | Davis | G06F 9/5077 718/1 |

OTHER PUBLICATIONS

Masayoshi Shimamura et al., "Architecture for resource controllable NVE to meet service providers' dynamic QoS demands," 2013 Fourth International Conference on the Network of the Future (NOF), IEEE, Oct. 23, 2013, pp. 1-6, XP032558769.

Wendong Wang et al., "Autonomicity Design in OpenFlow Based Software Defined Networking," GLOBECOM Workshops (GC WKSHPS), 2012 IEEE, Dec. 3, 2012, pp. 818-823, XP032341481.

"Next Generation Converged Operations Requirements," 3GPP Draft; S5-132097 NGMN Next Generation Converged Operations Requirements—Final Deliverable, 3rd Generation Partnership Project (3GPP), Mobile Competence Centre, Nov. 12, 2013, XP050745735, 489 pages.

METIS, "Mobile and Wireless Communications Enablers for the 2020 Information Society," FP7 ICT Objective 1.1 Future Networks, Feb. 2013, 2 pages.

* cited by examiner

METHOD OF MANAGING RESOURCES

FIELD OF INVENTION

The present invention relates to a method of managing resources, in particular network resources of a mobile communication network. Moreover, it relates to a resource controller for a network, to a network, a program element and a computer-readable medium.

ART BACKGROUND

The present invention relates to various technology fields, e.g. radio resource management, data base handling, network virtualization, software defined networking and network optimization.

Today mobile networks experience some exciting changes, technology wise and business wise. A schematic communication network 100 is shown in FIG. 1 comprising a global network controller 101 connected to a network controller 102 and to an application 103. The network control 102 is connected via northbound interfaces to a control layer 104 comprising a mediation layer 105, a TRA-SDN controller 106 and a NE+-SDN controller 107. Additional connections are provided by interfaces between the control layer 104 and the application layer 103. Furthermore, the control layer 104 is connected to a transport layer 108 as well.

In this context, it should be mentioned that new emerging technologies like cloud computing and software defined networking allow to have most of all networking functions run as applications (e.g. a Gateway application, Gw app in FIG. 1) in data centers on virtual machines (VM) which are organized by a cloud management system Infrastructure-As-A-Service (IaaS) entity with a cloud orchestration system CFW (Cloud Frame Work) organizing the deployment of applications in a data center. This way, applications become "resources" as well (aside from frequencies, bandwidth, spectrum or the like) that can be utilized on demand depending on networking demands—but those can also be offered to third party Mobile Virtual Network Operator (MVNO) to run applications on their behalf still leaving them full control on the applications themselves.

Similar developments happen in the transport network when SDN technologies are employed: via SDN controllers' data forwarding network elements NE and forwarding elements with additional capabilities (e.g. for GTP tunnel handling) NE+ can be configured by a network controller or by applications themselves. While SDN offers capabilities to configure and manipulate layer 2 and 3, optical layers can be configured accordingly via network management systems NMS and planning tools that offer alike control interfaces to applications/network controllers (northbound interfaces n/b). Network controllers can utilize transport engineering databases TED and path computation elements PCE to get a topology view on the transport network. This way, also transport can be considered a "resource" that can be configured and put in place on demand—and which also can be traded with $3^{rd}$ parties.

Finally, also radio resources (not shown in FIG. 1) like spectrum will become "resources" that can be utilized on demand for internal operator use or made available for $3^{rd}$ parties. In a future eco-system resources from all domains (radio, transport, mobile core) may become manageable, tradable and available on demand with cloud computing and software defined networking being the enabling technologies.

In this eco system this global network controller will require very sophisticated mechanisms and algorithms of how to trade given resources—physical ones (like spectrum and bandwidth) and virtual ones (applications on VMs).

It is assumed that wireless telecommunication will change dramatically within the next 10 years. To be prepared for the challenges caused by increase in traffic, number of mobile devices and new services that require higher traffic bandwidths the METIS project has been started end of 2012. METIS, which stands for >>Mobile and Wireless Communications Enablers for the Twenty-twenty (2020) Information Society<<, is a co-funded project of the European Commission with the target to evaluate and demonstrate key technologies components for the future 5G next generation mobile and wireless communications system.

After first discussions, the METIS consortium has identified spectrum availability as a key issue to meet the future requirements on wireless telecommunications.

SUMMARY

Thus, there may be a need to provide a method of managing resources of a network which enables a flexible allocation or distribution of resources in a network.

This need may be met by a resource controller, a network, a method of managing resources, a computer readable medium and a program element according to the independent claims. Further embodiments are described by the dependent claims.

According to an exemplary aspect a resource controller for managing resources in a network and arranged at a site of a first network entity is provided, wherein the resource controller comprises: a database, adapted to store resource managing related information; an interface adapted to receive a resource managing message from a second network entity at the first network entity; and a resource managing unit, wherein the resource managing unit is adapted to grant access to the stored resource managing related information on the database based on the received resource managing message.

In particular, the resource managing information and/or resource managing messages may relate to resource requests and/or resource offers. In particular, the resource managing may include or may consist of a resource trading. Therefore, the resource managing unit may be a resource trading unit and/or the resource managing message may be a resource trading message.

In particular, the access grant may include the right to read and/or copy the respective stored resource managing related information. Thus, the access may be either granted to the database, i.e. that the respective information is read and/or evaluated at that site, or it may be granted or given in that sense that the respective information is transferred to the second entity.

In particular, the network entities may be different operators or service providers of the network, e.g. operators of a communication network or a transportation network.

According to an exemplary aspect a network is provided, wherein the network comprises at least two network entities, wherein at least one of the network entities comprises a resource controller according to an exemplary aspect.

In particular, the network may comprise a plurality of network entities and/or several or all of the network entities comprise a resource controller according to an exemplary aspect. In case that the network entity is a person or company, e.g. an operator of the network, the resource controller may be under control of the network, e.g. arranged on a site of the network entity.

According to an exemplary aspect a method of controlling resources of a network comprising a resource controller including a database, a resource managing unit and an interface is provided, wherein the method comprises receiving, at the resource controller of a first network entity, a resource managing message via the interface, wherein the message is coming from a second network entity; and deciding to grant access for the second network entity to resource managing related information stored in the database at the first network entity based on the received resource managing message.

In particular, each of the network entities may be one operator of a plurality of operators of the communication network. For example, the communication network may be a mobile and/or cellular communication network. It should be noted that the first network entity may act or function as a merchant while the second network entity may act or function as a client or vice versa.

According to another exemplary aspect a program element is provided, which, when being executed by a processor, is adapted to control or carry out a method according to an exemplary aspect.

According to another exemplary aspect a computer-readable medium is provided, in which a computer program is stored which, when being executed by a processor, is adapted to control or carry out a method according to an exemplary aspect.

The term "resource managing information" may particular denote information which relates to the managing, e.g. trading, of resources in the network. Examples for such "resource managing information" may be information concerning specifics of a resource offer and/or specifics of a resource request, e.g. the amount of needed/offered bandwidth, spectrum, frequency or the like. The term "resource managing messages" may particularly denote any messages including resource managing information. Examples may be resource offers and/or resource requests.

The term "network entity" may particularly denote entities which are participants of the respective network and maintaining the services of the network. In particular, the term may include persons, like operators or service providers, as well as physical elements, like base stations, communication hardware, for example. The term "network entity" may particular not encompass a simple broker not providing any services maintaining the operation or functions of the network itself. The term "site of a network entity" may particularly denote a location or place at which the respective network entity has the power of control, e.g. the company building.

The term "resource" may particularly denote any limited goods or commodities needed to maintain a functionality of the network. For example in case of a transportation network, vehicles, roads, petrol or the like may be resources. In case of a communication network communication bandwidths, assigned frequencies, transmission bandwidth, transport bandwidth or the like may be resources. It should be noted that under the term real as well as virtual resources may be subsumed, since virtual resources like virtual machines or applications running on virtual machines, may also be limited. Examples of resources may be particular a frequency resource; a radio resource; a bandwidth resource; spectrum resources; transport resources; virtual machine resources; application resources or the like.

The term "database" may include the physical storage device as well as the data stored on such a physical storage device, i.e. the term may also relate to the collection of data stored on a storage device.

Such a described resource managing or trading may in particular enable that a given resource can be more efficiently used in the network, since a first network entity may offer resources which it does not need at a given point in time so that another network entity may use the same. Thus, a more uniformly network capacity utilization may be enabled. It should be noted that the resource controller may be used for both sides of a trading action, i.e. the resource controller may be operated on the side of the merchant of the resource and/or on the side of the client of the resource.

By providing a resource controller, wherein the resource controller may be directly located at the location or site of a network entity, a flexible managing of resources may be enabled by allowing allocating the resources to changing network entities, e.g. operators, via the sending of resource managing messages. In particular, the provision of resource controllers located directly at the network entities forming the network and providing the services of the same, it may be enabled that no simple broker is necessary any more in the network. Thus, a local or non-centralized brokerage may be enabled. In other words contrary to common resource broker typically providing a central platform for trading resources the resource controller are arranged locally and are adapted to allow for an access to their database depending on the received resource managing message. For example, access may only be granted to specific other network entities, only in the case that a matching of a resource offer and a resource request (one of which may originate from the respective network entity) is likely.

In particular, the provision of local resource controllers may take into account that network entities (operators) are very sensitive with respect to exposing information about how much of their resources remain unused or in which places or at what times they run into bottlenecks. The use of local resource controllers under the control of the network entity may fulfill their demand for absolute anonymity on the one hand while possibly enabling requesting binding contractual relationships with potential resource users on the other hand.

Additionally, local resource controllers may avoid the necessity of global brokers (not being part of the network itself, i.e. no service provider of the network) which would otherwise get access to the sensible data described in the past paragraph and on the other hand would represent another link in the value chain. Due to the avoiding of further involved brokers the resource management may also be speed up.

Furthermore, the resource controller according to the described aspect may support flexible options to get/offer resources.

Considering also the experience from the recent past related to the complex and time consuming spectrum refarming negotiations, it is obvious that beside the typical coverage and capacity topics it would also be preferable to find new ways to speed up the licensing processes for underutilized and new spectrum. A new and promising way to overcome these problems and to provide more spectrum to the mobile telecommunication community.

Summarizing a gist of an exemplary aspect may be to provide a method and device for managing resources in a network operated by network entities, wherein no external (other than the network entities constituting the network) entities, e.g. brokers are used for managing resources. Thus, one may say that the method or device relates to a brokerless brokerage. The managing of the resources may be performed by the network entities itself and/or may be performed or at least supported by resource controllers including local databases and a resource managing unit. The resource managing unit of the resource controller may help when deciding which other network entity gets access to information stored in a database being part of the respective resource controller as well.

In the following further embodiments of the resource controller will be described. However, the described components and features may also be used in connection with the network, the method of managing resources, the program element and the computer-readable medium.

According to an exemplary embodiment of the resource controller the resource managing message and/or the resource managing related information include a managing policy.

In particular, there may be at least two policy types. One policy type may contain rules and parameters, used to select resources, which are requested by the network managing process, e.g. a network, service and business planning process. The other policy type may contain rules and parameters used to select a best match for resource offers and requests from the resource managing unit, e.g. a resource trading unit or module.

The term "policy" may particular denote conditions or rules associated with resource managing, e.g. with resource offer and resource requests. The provision of such policies may be a suitable or efficient way to link resources and/or the managing/trading of resources with specific conditions or rules which have to be or should be fulfilled when managing or trading theses resources. In particular, there may be provided compulsory policies, i.e. policies or conditions which has to be fulfilled, and optional or facultative policies, the fulfilling of which is preferred but not compulsory.

The provisions of such policies may enable on the one hand a flexible managing of resources since the respective conditions may be tailored to specific needs and may be modified in each message, representing for example a request and/or offer for a resource. On the other hand also general policies may be defined which are identical for each managing transaction. Possible policies for managing a resource may be to ensure that the resource is used in the most efficient way, the network is operated at full or highest capacity, or the like.

According to an exemplary embodiment of the resource controller a trading function is implemented in the resource managing unit, which is adapted to evaluate information included in the resource managing message and/or in the resource managing related information.

In particular, the trading function may be implemented by a trading engine, e.g. a respective hardware unit having a specific software component stored and/or implemented thereon. Such a trading engine or trading function may in particular include a rating function and/or a booking function and/or an authorization function or may be implemented on a trading and booking engine. For example, the rating function may be adapted or programmed to evaluate whether offers and requests relating to network resources are matching or not. Alternatively or additionally, such a rating function may determine the best match between two resource managing related information. The evaluation may consider policies and further information included in the resource managing message and/or stored in the database. In particular, the rating functions may be used for evaluating offers and requests (with respect to matching compatibility). Thus, resource offers and resource requests may be examples of information or data present in a resource managing message. In general, the resource managing unit thus includes a plurality of functions or engines, e.g. authorization functions, certification functions, rating functions, booking functions or the like, i.e. may include all functions or engines necessary to manage the respective resource.

According to an exemplary embodiment of the resource controller the resource managing message relates to a resource offer or to a resource request.

According to an exemplary embodiment of the resource controller the resource managing unit is adapted to determine a match between a resource offer and a resource request.

In particular, a rating and/or booking function implemented on the resource managing unit may be adapted to perform the match between a resource request, e.g. stored on the database or received by the resource managing message, and a resource offer, e.g. stored on the database or received by the resource managing message. The provision of a managing unit adapted in such a way may be an efficient way to provide a mediating function mediating between different needs of different network entities. Thus, the rating function and/or booking function may also be called a mediation function.

According to an exemplary embodiment of the resource controller the resource managing message includes an identifier identifying the second network entity.

In particular, the identifier may be a unique identifier uniquely identifying the respective network entity. For example, the identifier may be an electronic signature, an electronic certificate, a personal cryptographic key or the like. Such an identifier may allow for a unique and certified validation or identification of the respective network entity and may thus allow for ensuring a minimum authentication of the network entity.

According to an exemplary embodiment of the resource controller the resource managing unit is adapted to convert between different descriptions of the same resource.

In particular, the conversion may be performed by a trading and/or booking function implemented in the resource managing unit.

The term "resource description" may particularly denote data or information describing the resource, in particular with respect to its technical parameters, e.g. size, frequency, bandwidth, spectrum, transport bandwidth, kind of application, kind of service which can be provided by the resource, and so on. For example, while a requesting entity may request a resource of a given bandwidth, e.g. 2 Mbits/s, another corresponding description for the same resource may be the provision of a specific frequency band, e.g. 5 MHz. Thus, the ability of conversion may allow for different descriptions of the resource in the request/offer which at the one hand may improve an initial anonymity of the network entity and on the other hand may allow for an increased number of matchings between offers and requests. In particular, the description of the resources may comprise or may provide an abstract representation of a resource.

According to an exemplary embodiment of the resource controller the resource is described by one out of the group consisting of: frequency, bandwidth, spectrum, transport bandwidth, broadband wireless best effort service, available services, available applications, transmission capacity, and any combination thereof.

In addition, those can be further classified into time-wise availability or geographic availability. It should be noted that the time or time window for which the resource is requested or offered for may be a part of the resource description as well. Furthermore, resources can comprise of or may describe an abstracted representation, for example, a request or an offer for a broadband wireless best effort service for a number of concurrent sessions in a geographic area at a given time window. Those abstracted resources may be realized by different combinations of said physical resources, e.g. a combination of different physical transport (ATM, carrier Ethernet of IP-routing) combined with one radio frequency band or with several scattered radio frequency bands. Resource controllers on either side (client/merchant) provide the capabilities to compile abstract resource requests into physical resources, or a combination of physical resources, respectively.

According to an exemplary embodiment of the resource controller the resource is a communication resource.

The term "communication resources" may particular denote any resource which is associated with a communication and the maintenance of a communication service, and which has an influence on the communication in and/or performance of a communication network e.g. frequency, bandwidth, services, applications transport, virtual spectra, or the like.

In the following further embodiments of the method of managing resources will be described. However, the described components and features may also be used in connection with the resource controller, the network, the program element and the computer-readable medium.

According to an exemplary embodiment of the method the resource managing message includes a resource request and/or a resource offer.

According to an exemplary embodiment the method further comprises matching a resource offer and a resource request taking into account predetermined policies.

In particular, the predetermined policies may be transmitted together with the resource managing message and/or may be policies which are defined or negotiated globally or locally in advance. For example, such defined policies may be stored in the database for future access and/or use.

According to an exemplary embodiment the method further comprises sending a response message in response to the received resource managing message.

In particular, the response message may include a result of a matching process, e.g. information concerning a corresponding best match, and/or may include information concerning a granted access or non-grant of access, and/or an identifier identifying the first network entity to the second network entity. In case of a non-grant of access a reason for the rejection may be included in the response message. The response message may be sent from the first network entity to the second network entity. For example, a specific resource offer may be included in the response in case the received resource managing message was a resource offer or vice versa.

According to an exemplary embodiment of the method the resource managing message includes information about a type of resource managing action.

Examples types for the resource managing (and/or trading) action may be:

"resource auction", wherein the managing (trading) function collects corresponding offers or requests from other network entities until end of the defined period before starting the evaluation via a rating and/or booking engine. The best matching offer/request pair from other operators may be accepted and all other operator offers or requests shall be rejected;

"resource shop", wherein the managing (trading) function evaluates a corresponding offer/request match from other network entities case by case and decides via a rating and/or booking engine to accept or reject the offer or request. As soon as a trade is accepted for the resource, the trade will be closed, i.e. all subsequent offers or requests from other operators are rejected from the resource managing (trading) function.

Summarizing an exemplary specific embodiment may be based on the idea to introduce a resource controller with a managing function set to manage resources in a network. The resource controller may evaluate and rate network resource requests based on services requirements that are planned to be offered to users of the network or other network entities, e.g. operators. Resources, which are not available but necessary for a planned service, and resources, which are available but unused may be passed to a resource managing or trading function. The resource managing or trading function may decouple resource requests from resource offers, store them in a database while references to resource traders (merchants) and resource consumers (clients) may only be stored in the database, not exposing this information to either side unless those mutually agree on it. Additionally, there may be functionality to continuously verify resource requests to resource demands and to link matching demands to matching offers such that a resource owner (merchant) will be able to deliver a resource to a requesting operator (client). Finally, the resource controller may establish binding contracts between network entities (acting as merchants and clients), it may store the context in case of future liability issues and it may certify contracts for accountability.

In general the method and resource controller according to the exemplary specific embodiment may provide a new way for trading mobile resources, especially spectrum resources, between spectrum owners and spectrum users. The spectrum owner may be comparable to a merchant while spectrum user plays the role of a client.

The aspects and exemplary embodiments defined above and further aspects of the invention are apparent from the examples of embodiment to be described hereinafter and are explained with reference to these examples of embodiment.

DETAILED DESCRIPTION

Figure 1:
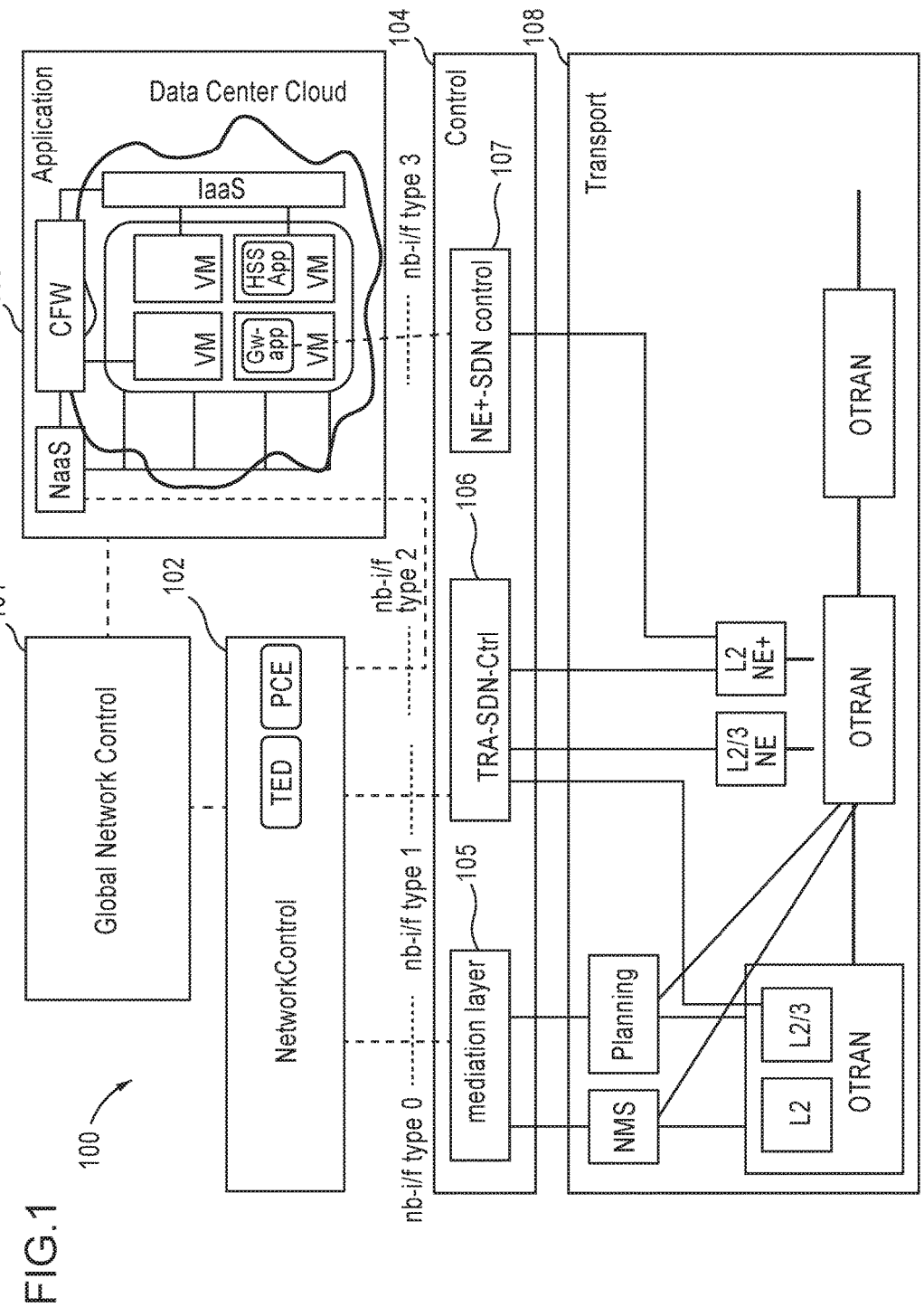
FIG. 1 schematically shows elements of a communication network.

The illustration in the drawing is schematic. In the following a detailed description of exemplary embodiments is given.

In particular, a detailed description with respect to a technical field of application will be given. While a specific field (communication network) is chosen for the following description it should be mentioned that the same principles may be applied in different fields, e.g. in the field of transports of goods or people.

In the beginning some consideration concerning the technical field of communication networks and managing resources in a communication network will be given which helps for understanding the present invention.

Scare and expensive resources such as radio frequencies are always subject of maximum usage, which, for one network entity or operator only, is hard to handle:

On one hand, due to given circumstances, the spectrum, or parts of a spectrum of an operator cannot be sufficiently used by his customer base at a certain place at a given time (holiday season)—thus this scare resources remain unused.

On the other hand, there are situations, where an operator might require additional spectrum capacity (e.g. during the course of a mega event, e.g. sponsored by this operator), but with the spectrum resources he had been assigned by the regulator he cannot serve the demand.

For a comprehensive solution for resource managing three main obstacles that hinder a mutually agreed solution may have to be solved:

operators may be very sensitive with respect to exposing information about how much of their spectrum remains unused or in which places or at what times they run into bottlenecks; thus they demand for absolute anonymity on the one hand while they are requesting binding contractual relationships with potential spectrum users on the other hand carving out the functionality of trading to a third party provider (a broker) may not be acceptable first because of trust reasons and second because this would involve another one in the value chain operators may require a solution that supports flexible options to get spectrum. This includes network sharing, spectrum trading and further spectrum sharing options.

While spectrum sharing is in principle possible, when it is necessary to guarantee quality of service and quality of experience there is only one solution acceptable—the exclusive use of spectrum. Exclusive use of spectrum is realized by using licensed spectrum, where licensed spectrum is defined by the spectrum itself, a location where this spectrum is used, corresponding usage times and further properties like inbound and outbound interference threshold definitions.

For sharing spectrum a spectrum broker, i.e. a third party not providing any services specific to the network (no operator of the network) may be implemented to dynamize the spectrum license mechanism, i.e. a spectrum is no longer owned by an operator, but an operator may request spectrum and the spectrum broker provides respective spectrum resources based on pre-defined policies and availability. Key problem of such spectrum broker concepts is that most of the required spectrum for today's services is already licensed to different operators and it is therefore no longer available for brokerage. To even worsen the situation: there are several use cases, (some of them are defined in METIS as test cases TC1-TC12), which require a mix of spectrum, e.g. spectrum below 1 GHz to provide a satisfying coverage for an area and spectrum at 3.5 GHz at selected areas to provide high throughput for end users.

Current discussions show that spectrum up to 60 GHz needs to be supported to cover the requirements of the new services in the year 2020. In general not all required spectrum is owned by a single operator. In order to get access to required spectrum for a specific service it is necessary to offer new ways to get to new spectrum. This includes for example mechanisms like Licensed Shared Access as well as classical spectrum auctions and network sharing between operators.

Due to the lack of an appropriate solution, the real potential of spectrum sharing has yet not been harvested. If, at all, spectrum is to be shared between two operators, those scenarios base on bi-lateral agreements, which is a cumbersome case-by-case business.

In the following an exemplary embodiment of a resource controller with a function set to manage resources in an operator network will be described. The resource controller may evaluate and rate network resource requests based on services requirements that are planned to be offered to users of the network or other operators.

Figure 2:
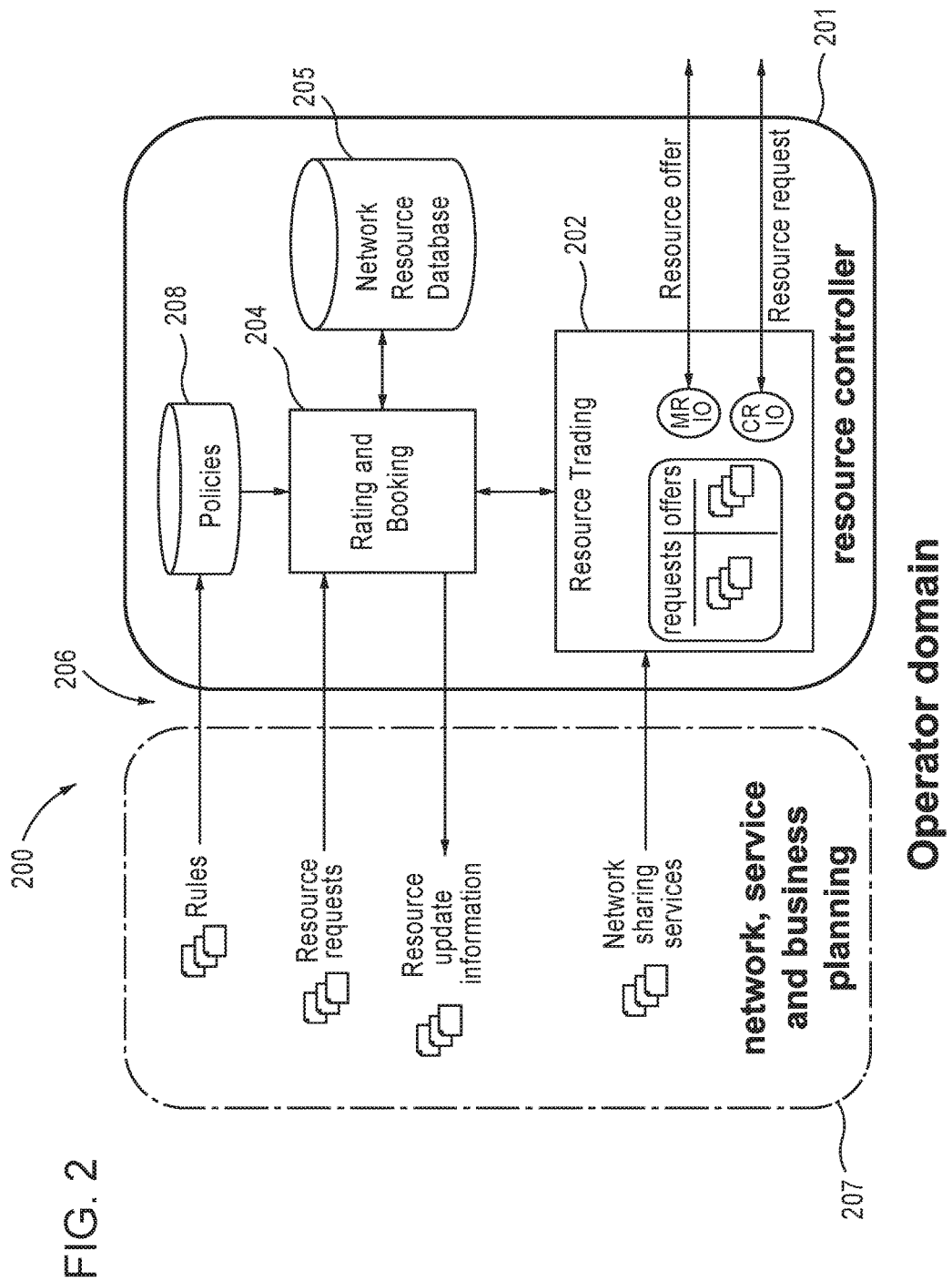
FIG. 2 shows a schematic diagram of a network controller system with its components and interfaces installed in the network.

FIG. 2 shows a schematic diagram of a network controller system 200 with its components and interfaces installed in the (operator) network. In particular, FIG. 2 shows the network controller system 200 implemented or located in the operator domain (site of a network entity) and including a resource controller 201. The resource controller comprises a resource managing unit 202 which may be adapted to provide a resource trading; a rating and/or booking engine 204 and a database 205. Additionally the resource controller 201 comprises an interface 206 connecting between the resource controller 201 and a network, service and business planning module or engine 207. Via this interface 206 network sharing services may be exchanged with the resource managing unit 202, resource requests and resource update information may be exchanged with the rating and/or booking engine 204 and rules may be exchanged with a storage medium or engine 208 of the resource controller. Additionally, a further interfacing function (either by the same interface or an additional interface) is provided to receive and transmit resource offers and resource requests to other network entities (operators), e.g. to other network controller system.

In a network service and business planning process there may exist situations where network resources are required, e.g. a network entity (an operator) plans to introduce new user services or wants to offer network sharing capacity to other network entities (operators). To automate the process for resource management, a resource controller is introduced to the network. The resource controller provides at least one physical interface that allows the following interactions with the network service and business planning process:

Configuration of policies, used to weight, prioritize and select resources for services and sharing offers from other operators (trading)

Exchange resource request and response information

Inform the network, service and business planning process about new resources

Exchange information on network sharing services to be offered to other operators Configuration of Policies: There are at least two policy types. One policy type contains rules and parameters, used to select resources, which are requested by the network, service and business planning process. The other policy type contains rules and parameters used to select the best match for resource offers and requests from the resource trading module.

Resource Request and Response: Resource requests and responses are used for resource management and resource trading. Resource requests that cannot be completed successfully are rejected and the initiator is informed additionally about the reason for the reject (e.g. resource is not available). The interface may support the following messages:

| Command | Type | |
|---|---|---|
| | Resource Management | Resource Trading |
| Inform | Addresses the network resource database and informs about status (free or used) of addressed resources | Addresses the resource trading function and informs about own and other operator's resource requests and offers; this includes requests and offers with status open, active, closed, or a combination of these criteria |
| Initiate | n/a | Addresses the resource trading function and generates a resource request or offer for the specified resource |
| Stop | n/a | Addresses the resource trading function and stops open or active resource requests and offers. Active resource requests and offers may require specific handling due to contract agreements with the partner operator (e.g. bid to auctions) |
| Book | Addresses the rating and booking function and marks the addressed resources in the network resource database as used | n/a |
| Release | Addresses the rating and booking function and marks the addressed resources in the network resource database as free | n/a |

Information on New Resources: Resource trading actions may be active during a longer time period. In order to pass over information on new resources to the network service and business planning process as soon as possible the resource controller provides a respective interface.

Network Sharing Services: Resources may be shared in combination with network equipment (e.g. network capacity sharing via 3GPP network sharing methods). To cover such cases the operator has to book respective resources at the resource controller and configures the network with these resources to provide the respective network sharing service. After the service is available the operator has to provide the new network sharing service to the trading unit or module of the network controller. The interface supports two actions: initiate and stop the trading of a network sharing service.

The operator specifies services according to their specific consumption of resources in a network service and business planning process and generates a respective resource request to the resource controller. The rating and/or booking engine may analyze available resource information which is stored in an operator network resource database with respect to the resource consumption information and may apply policies which may provide additional rules to weight, prioritize and select resources. This analysis may deliver one of the following results:
  Required resources are available: the resources are assigned to the service and marked as used in the network resource database; the requesting network entity (operator) is informed about the successful assignment of those resources
  Needed resources are not available: the request is rejected and the requesting network entity is informed about the non-availability of the resources
  Optional: Resources are available, but already used by other services: the resources are assigned to the service and marked as overbooked in the network resource database. Additionally the resource trading function is triggered either manually via the network service and business planning process or automatically (based on a policy rule) to generate resource trading requests to balance the overbooked resources; the registration function is informed about the successful assignment of resources.

If the network service and business planning process detects a missing resource by receiving a request information response, a reject message, or a resource overbooking situation, a resource trading request for the missing resource may be generated and sent to the resource trading function of the resource controller. Another approach to trade resources may be that the operator may plan to offer either network sharing services or a direct sharing of a resource (e.g. spectrum sharing). In the latter case the resource may be requested by the sharing service as described above and then offered to other operators. Depending on the trade type it is possible to define a resource trade being valid for a defined period of time or for a point of time as follows:
  Type1=resource auction: the trading function collects corresponding offers or requests from other operators until end of the defined period before starting the evaluation via the rating and booking engine. The best matching offer/request pair from other operators will be accepted and all other operator offers or requests shall be rejected.
  Type2=resource shop: the trading function evaluates a corresponding offer/request match from other operators case by case and decides via the rating and booking engine to accept or reject the offer or request. As soon as the trade is accepted for the traded resource, the trade will be closed, i.e. all subsequent offers or requests from other operators are rejected from the resource trading function.
  Further trade types may be introduced to realize other, more complex trading models. Examples: A model is introduced to allow the splitting of an offered resource to match with more than one other operator resource requests. Further models may introduce auctions based on the primary or secondary auction types, e.g. English auction, Dutch auction, combinatorial auction.

Additionally to the trade type, the trade method may be defined to distinguish between following trading models:
  Method=master: the trade request or offer is stored locally; other platforms are informed about the open request or offer. When another platform sends a respective offer to an open request or vice versa the resource trading function may perform the evaluation and may inform the other platforms which have provided an offer or request about the evaluation result
  Method=slave: the trade request or offer is used to send an answer to open master trades from a partner trading platform. The partner platform may perform the evaluation and informs the resource trading function about the evaluation result Based on the trade method, the trading function may act either in the client role or in the merchant role.

Figure 3:
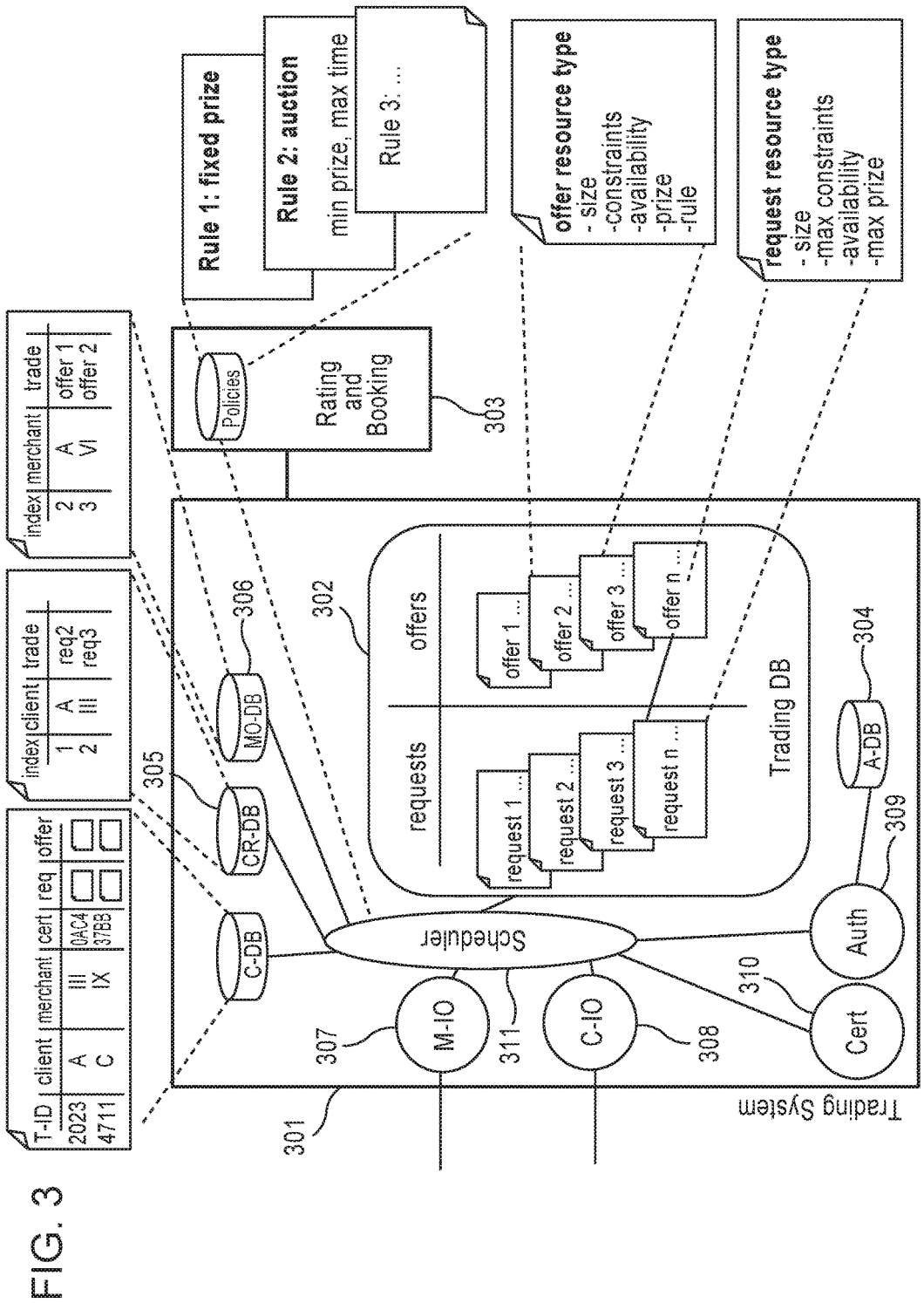
FIG. 3 shows a principle setup of the resource trading function.

FIG. 3 shows a principle setup of the resource trading function. In particular, FIG. 3 shows a trading system or resource managing unit 301 of a resource controller. The center part of the trading system 301 represents a Client/Merchant system. Its core component comprises a trading database 302 where the operator can place a request or offer for given resources, represented by a database record "trade request resource" or "trade offer resource". Here, the type of the resource, e.g. a transport bandwidth (in case of a transport provider) or a spectrum (in case of a mobile network operator)—or whatever—can be specified. Additionally, further information or descriptions specifying the offer needs to be provided either locally or as reference to other databases (e.g. the network resource database for technical parameters and a trading data base for commercial and business data): the size of the resource (e.g. bandwidth in Mbps of spectrum in MHz), the time period in which this resource is available, the geographical area where the resource can be used, specific constrains for a resource, and the prize for the traded resource. Such restrictions could, for example comprise of a limited period of time for which the merchant wants to get the resources back. In detail: a merchant offers the resource with the constraint that he might request back the resource for 2 h upon a 1 h notice. Rules to select the best offer from other operators for requested resources and best fitting requests from other operators to offered resources may be provided as predefined policies to the rating and booking engine 303. Those rules could be: offer at a fixed prize, auction with a minimum prize for a maximum period or others.

In addition to resource offers, resource requests can be issued by operators in a "request resource" template. Those comprise of a similar set of the resource description as exists for offers, however, resource offers and requests that use the trading method "master" should include a rule defining how to trade (trade type).

The trading database 302 comprises a number of records that represent resource requests and another number of records that represent of resource offers. Both kinds of templates can be stored in one database or in separate ones. With a resource type indicator being used, the trading database may handle a variety of different resource types and client/merchant types, respectively.

It is assumed that other resource traders, e.g. operators and resource owners have a subscription context with the trading function. Such subscriptions typically result in trader-ID/merchant indication/client indication/password sort of context (denoted as credentials further on). Credentials for resource traders are stored in an authentication database A-DB database 304 in FIG. 3. The procedure of subscriptions is state of the art in electronic ware houses and thus not described here.

The resource trading system 301 may hold two other databases. One (CR-DB) 305 which stores the contexts of trader-IDs with a client role and the corresponding index that allows to point to the corresponding resource template in the trading database, these contexts again being referenced by the index in the CR-DB database (request index). The other (MO-DB) database 306 which stores the contexts of trader-IDs with a merchant role and the corresponding index that allows to point to the corresponding offer template in the trading database, these contexts again being referenced by the index in the MO-DB database (offer index).

Finally, there may be a function that allows merchants and clients to communicate with the trading function by respective M-IO 307 and C-IO interfaces 308. The communication can be based on HTTP or use more advanced IP based protocols such as RADIUS and DIAMETER.

Furthermore there may be an authentication function (Ruth) 309 which allows verifying the validity of access requests from clients and merchants. In a simple implementation, this function compares a password provided with an ID in an access request to the credentials stored in the database (A-DB) 304.

Optionally there is a certification function (Cert) 310 that can provide certificates to contracts that may result if request and offer match.

The trading function of the trading system 301 is driven by a scheduler 311, which manages the communication between clients/merchants and the trading function, which invokes authentication, which cares for data base entries, which continuously triggers a rating and/or booking function on the rating and/or booking engine 303 to search for matches between requests and offers and which finally establishes binding contractual relationships between merchants and clients for a given resource. If a contract will be established, the details of the contract (records of matching resource request and resource offer, merchant trader ID and client trader ID, the certificate that was used may be stored in yet another database which are referenced by an index that allows to point to the according database entry. This index could be a transaction index which is an incremented counter (incremented with each new entry).

Figure 4:
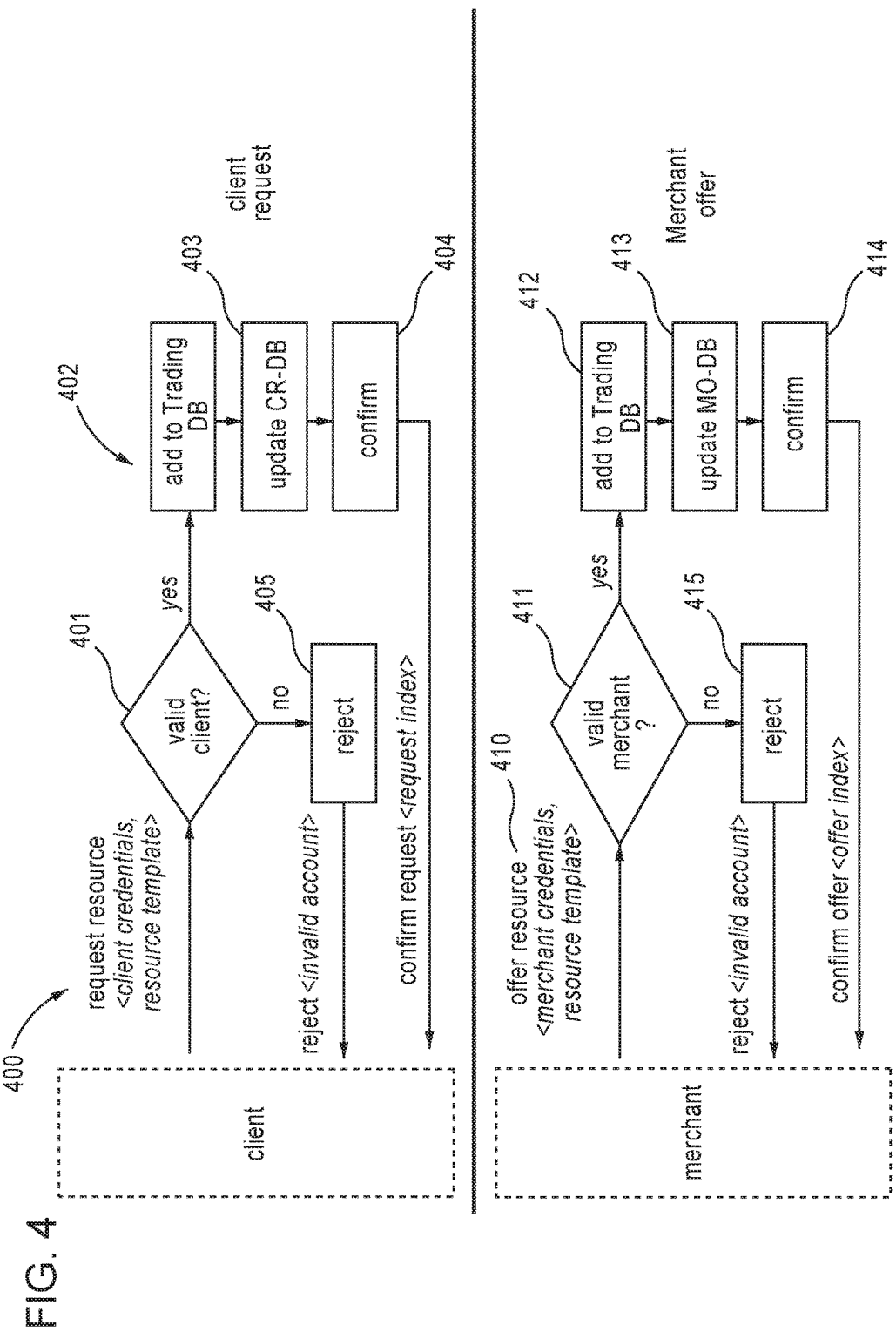
FIG. 4 shows how the trading function is operated.

FIG. 4 shows how the trading function is operated in case a client side resource request (upper part) or a merchant side resource offer comes in.

Clients issue a request message 400 with a resource template (describing the demanded resource) and client credentials (received during subscription) being part of the message.

Merchants issue an offer message 410 with a resource template (describing the offered resource) and merchant credentials (received during subscription) being part of the message. In both cases, first authentication (401 and 411, respectively) is applied. If it was successful, the request or offer will be added to the trading database (402 and 412, respectively) and the corresponding CR-DB 403 or MO-DB 413 will be updated. The client and the merchant will get a confirmation of their request or offer with a request index or an offer index as reference (404 and 414, respectively). Most beneficially, the index reported is the index of the according record in the trading database.

If the authentication and authorization check was unsuccessful, the request/offer will be rejected (405 and 415, respectively).

Figure 5:
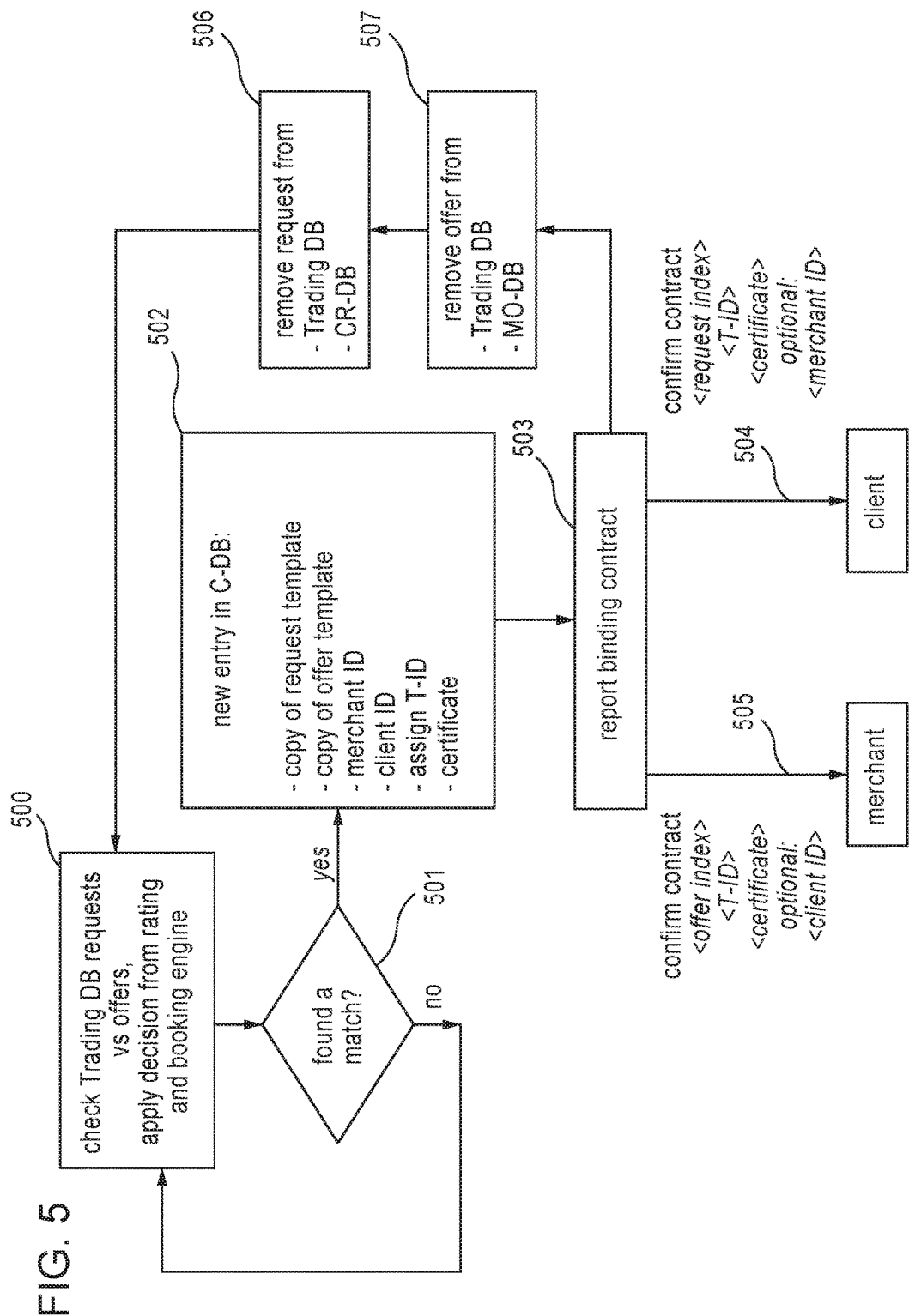
FIG. 5 shows how the trading function operates to get as many resources traded as possible.

FIG. 5 shows how the trading function operates to get as many resources traded as possible so that a good use of capacity may be enabled. Continuously, the scheduler and rating and booking engine will check 500 whether there is a matching resource offer for each existing resource request and vice versa. Matching in this context may mean, that resource types are equal, resource sizes and ranges are in an acceptable range, constraints given by the merchant are acceptable by the client, time ranges match. In case of trade type=auctioning was implied by a merchant, the client with the highest prizing offer will be considered as a best match.

Most beneficially, in order to avoid that always entries with the lowest index are analyzed first, the trading database shall be searched through in a non-subsequent manner, e.g., access to records shall be arbitrary rather than counting bottom up or down to bottom.

If a match is found 501, the contract database C-DB will get a new entry with copies of the matching templates, M-ID and C-ID, a transaction ID and a certificate 502. A binding contract may be formed 503. Both, the matching client (referenced by C-ID) 504 and the matching merchant (M-ID) 505 will be sent the contractual information including the transaction ID and the certificate, both referenced by the offer index or request index that was sent alongside with the request/offer confirmation (FIG. 3). Optionally, the client ID and the merchant ID can be mutually exchanged (if both partners agreed so).

Finally, the according entries are marked as no-longer available in the trading database and the corresponding CR-DB 506 and MO-DB 507.

The resource trading function allows various modes of operation, addressing any wanted beneficial relationship while excluding all unwanted ones.

Figure 6:
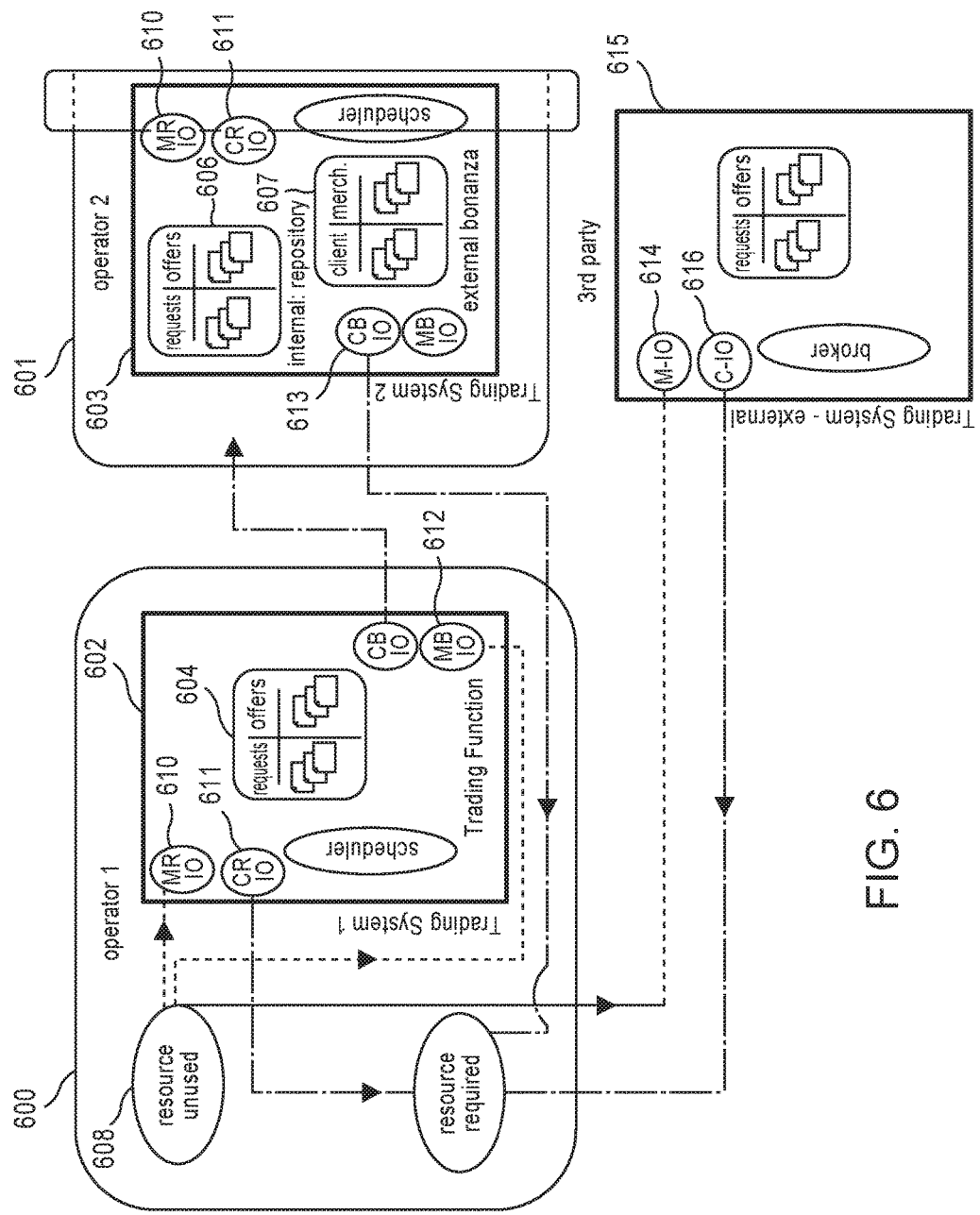
FIG. 6 shows another implementation as a distributed marketplace.

FIG. 6 shows another implementation as a distributed marketplace. In FIG. 6, two operators 600 and 601 run their own trading function 602 and 603, respectively on respective resource controllers, e.g. to handle spectrum resources. The implementation is such that data bases 604 of the respective resource controllers comprise an internal part 606 and of an external part 607. Most typically, operators' workflows have to be managed over a huge organization (e.g. several countries, several departments) and it might be worthwhile having such a resource marketplace for internal resource handling. On the other hand, parts of the resources could also be made available to other operators in case there is no internal need to use them. Thus, if within one organization, resources are unused or are subject of sharing, ("resource unused" 608 in FIG. 6) those can be put into the internal database ("repository" 604, in FIG. 6) For clarity reasons, the respective internal and external databases are only shown separately for operator 2. Other departments or organizational units of this operator will then have access to them in the same manner as described above using the MR-IO 610 and CR-IO 611 interfaces. Additionally, if not been used internally, those resources can also be put into an external database via MB-IO interface 612 ("bonanza" in FIG. 6) accessible for selected operators only via CB-IO interface 613, again, in the same manner as described above. And finally, operators could additionally push (via M-IO interface 614) those resources to $3^{rd}$ party marketplace 615, e.g. spectrum brokers (615, FIG. 6).

Additionally, FIG. 6 shows a second operator, who is requesting resources through the CB-IO interface 613 from the first operator. Furthermore, the $3^{rd}$ party 615 as well requests resources via its C-IO interface 616 from the first operator 600.

Figure 7:
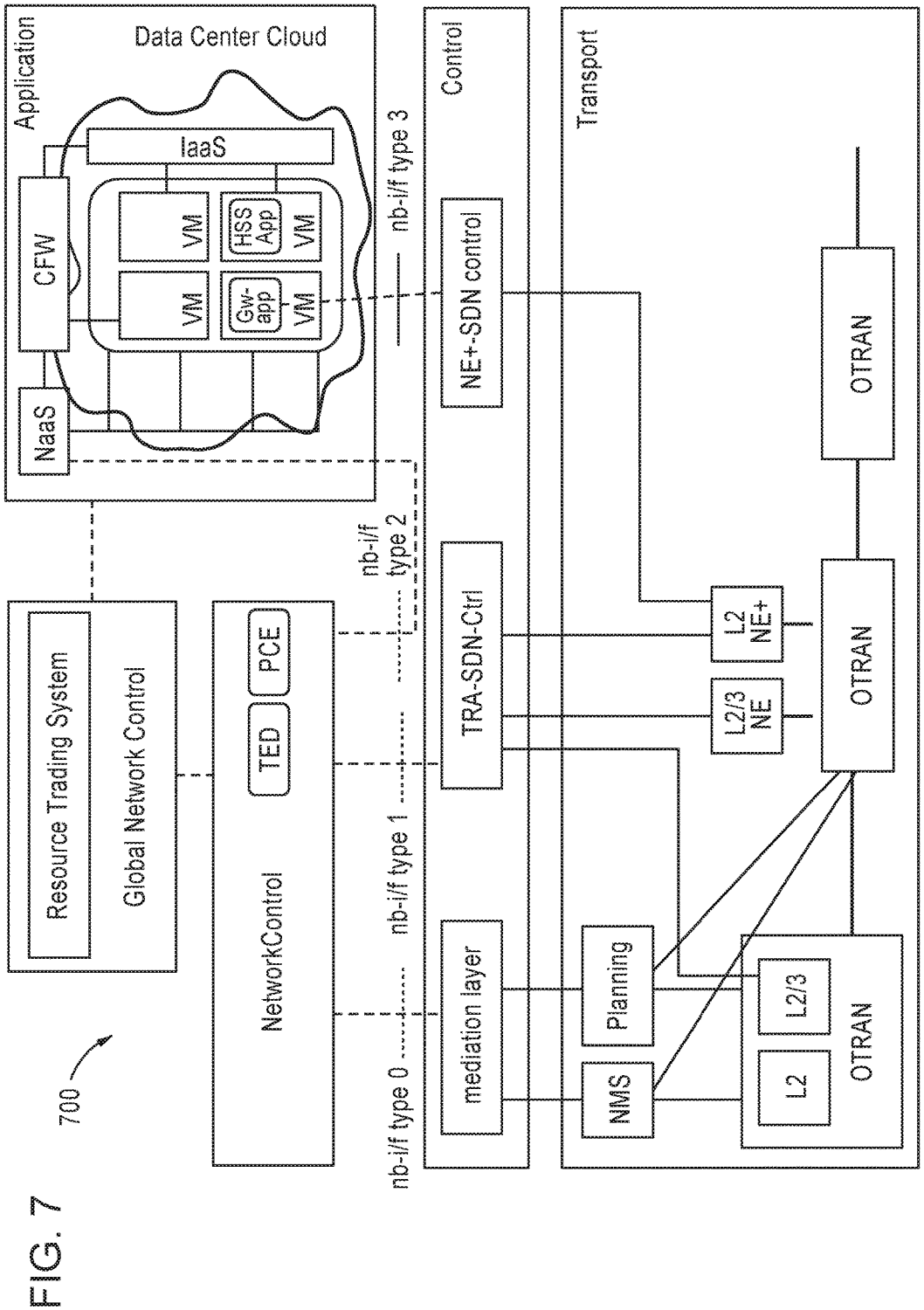
FIG. 7 shows a resource trading system according to an exemplary embodiment.

FIG. 7 shows that a resource trading system 700 as described above well fits into a global network control system of a virtualized mobile network as described in the context of FIG. 1. It could either become an integral part of it or become an on-top backend function of e.g. a self organizing network function SON. In principle the only difference to FIG. 1 is that the global network controller now includes a resource trading system or resource controller according to an exemplary embodiment.

Figure 8:
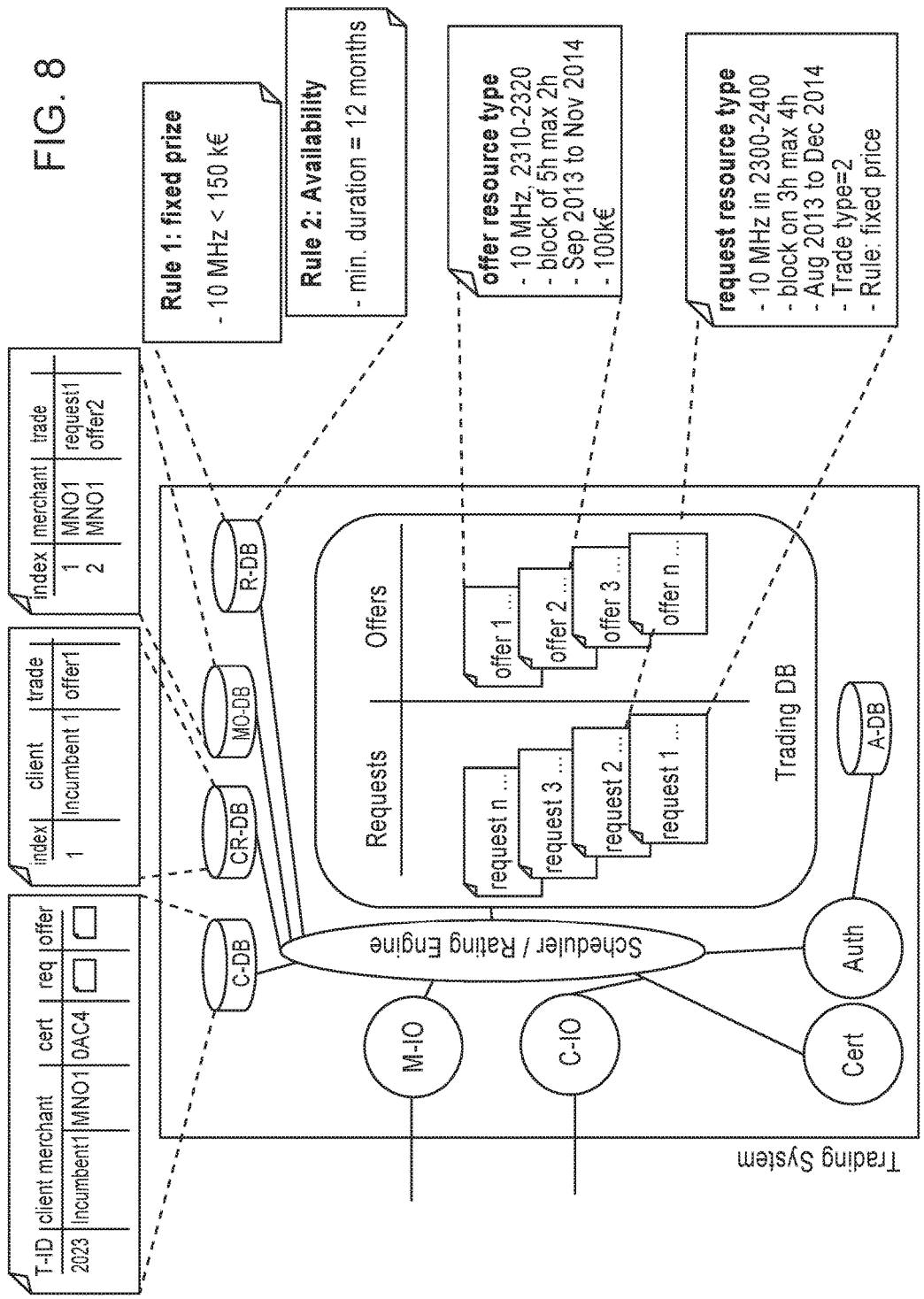
FIG. 8 shows how such a resource controller with a trading function.

FIG. 8 shows how such a resource controller with a trading function that could be applied to share spectrum according to the ASA (Authorized Shared Access) Framework. In principle, FIG. 8 is similar to FIG. 3 (aside from putting together the scheduler and the rating and booking engine) and will not be described in detail but only with respect to the specific embodiment of sharing spectrum. The network controller is operated by a Mobile Network Operator.

The Mobile Network Operator MNO1 detects during the monthly network analysis that it would be beneficial to get additional 10 MHz spectrum to overcome temporarily bottlenecks in the radio access network in a city area. It is assumed that base stations which would operate on the additional spectrum are capable to run additional spectrum between 2.3-2.4 GHz. Resources that are traded are spectrum slices. The Mobile Network Operator generates a spectrum trade request with type=shop and method=master for the 10 MHz in the 2.3-2.4 GHz range and provides this spectrum trade request to the trading function as a client. In FIG. 8 an Incumbent1 is defined as merchant that is allowed to provide offers to the trading system of MNO1. The Incumbent1 receives the open request, checks own resources and finally offers a 10 MHz spectrum slice 2310 MHz to 2320 MHz for 17 months starting September 2013 at a fixed price of 100 k€. The constraint given is he might request back the spectrum with a 5 h notice for a maximum of 2 h. The offer is sent via the merchant interface as resource offer with type=shop and method=slave.

The scheduler with its integrated rating engine analyses immediately the resource offer due to the trade type=shop information and checks if the offer would match to the request and the defined rules. The offer matches to the request definitions except of the time interval, but with respect to rule2 which defines to accept an offer that provides at least 12 month availability for the spectrum the offer is finally accepted by the rating engine.

The trading system of MNO1 acts for the request as master, i.e. a contract comprising of details would be generated and sent to Incumbent1 and be stored in the contract database C-DB.

In specific use cases, where an external trading system is used (e.g. as a broker system) and the trading system trade spectrum with multiple MNOs and/or Incumbents) it would make sense to expose the merchant ID to the client and vice-versa: the requirement to hide available operator requests and offers is fulfilled; only the bi-lateral request and demand would be made visible to the other party.

Another beneficial implementation would comprise a field in the request/offer template that indicates whether or not each party agrees that its operator ID will be sent to the peering partner as part of the contract information. This allows realizing flexible broker systems, where the resource broker would only provide this information to the peer if the partnering side has indicated its willingness to do so.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

LIST OF REFERENCE SIGNS 100 communication network
101 global network controller
102 network controller
103 application
104 control layer
105 mediation layer
106 TRA-SDN controller
107 NE+-SDN controller 108 transport layer
200 network controller system
201 resource controller
202 resource managing unit
204 rating and/or booking engine
205 database
206 interface
207 network, service and business planning module
208 storage medium
301 resource managing unit
302 trading database
303 rating and booking engine
304 A-DB database
305 CR-DB database
306 MO-DB database
307 M-IO interface
308 C-IO interface
309 authentication function
310 certification function
311 scheduler
400 request message
401 first authentication
402 trading database
403 CR-DB
404 confirmation of request
405 request rejected
410 offer message
411 first authentication
412 trading database
413 MO-DB
414 confirmation of offer
415 offer rejected
500 checking match
501 match is found
502 entry concerning transaction ID and certificate
503 binding contract
504 sending contractual information
505 sending contractual information
506 updating CR-DB
507 updating MO-DB
600 operator 1
601 operator 2
602 trading function
603 trading function
604 database
606 internal part DB
607 external part DB
608 resource identified as unused
610 MR-IO interface
611 CR-IO interface
612 MB-IO interface
613 CB-IO interface
614 M-IO interface
615 3rd party
616 C-IO interface
700 resource trading system

The invention claimed is:

1. A performance resource controller in a first network entity the performance resource controller comprising: a database adapted to store performance resource management information related to managing performance resources of a communication network, wherein the performance resource management information comprises at least one parameter related to at least one of one or more performance resource offers and one or more performance resource requests;

an interface adapted to receive a performance resource management message from a second network entity, wherein the performance resource management message comprises at least one of the one or more performance resource offers and the one or more performance resource requests: and a performance resource management unit adapted to grant access to the stored performance resource management information based on the performance resource management message.

2. The performance resource controller according to claim 1, wherein the performance resource management message or the performance resource management information comprise at least one management policy.

3. The performance resource controller according to claim 1, wherein a rating function is implemented in the performance resource management unit, which is further adapted to evaluate information included in the performance resource management message or in the performance resource management information.

4. The performance resource controller according to claim 1, wherein the performance resource management unit is further adapted to determine a match between a performance resource offer and a performance resource request.

5. The performance resource controller according to claim 1, wherein the performance resource management message includes an identifier identifying the second network entity.

6. The performance resource controller according to claim 1, wherein the performance resource management unit is further adapted to convert between different descriptions of a performance resource.

7. The performance resource controller according to claim 1, wherein a performance resource is described by at least one of:
frequency,
bandwidth,
spectrum, and
transport bandwidth,
broadband wireless best effort service,
available services,
available applications, and
transmission capacity.

8. The performance resource controller according to claim 1, wherein the performance resource is a communication performance resource.

9. A network comprising: at least two network entities, wherein at least one of the network entities comprises a performance resource controller according to claim 1.

10. The performance resource controller according to claim 1, wherein the performance resource management unit is further adapted to send a response message in response to the performance resource management message.

11. The performance resource controller according to claim 1, wherein the performance resource management message includes information about a type of performance resource management action, wherein:
the performance resource management action comprises at least one of a performance resource auction and a performance resource shop,
the performance resource auction comprises a management function that collects corresponding offers and requests from other network entities until an end of a defined period before starting an evaluation via a rating and/or booking engine, and
the performance resource shop comprises a managing function that evaluates a corresponding offer or request match from other network entities individually, and decides via a rating and/or booking engine to accept or reject the offer or request.

12. A method comprising: receiving, at a first network entity, a performance resource management message related to managing performance resources of a communication network from a second network entity, wherein the performance resource management message comprises at least one of one or more performance resource offers and one or more performance resource requests: and Granting, by the first network entity, the second network entity access to performance resource management information stored at the first network entity based on the performance resource management message, wherein the performance resource management information comprises at least one parameter related to at least one of the one or more performance resource offers and the one or more performance resource requests.

13. The method according to claim 12 further comprising: matching, by the first network entity, at least one of the performance resource offers and with at least one of the performance resource requests based upon at least one performance management policy.

14. The method according to claim 12, further comprising: sending, by the first network entity, a response message in response to the performance resource management message.

15. The method according to claim 12, wherein the performance resource management message includes information about a type of performance resource management action wherein:

the performance resource management action comprises at least one of a performance resource auction and a performance resource shop, the performance resource auction comprises a management function that collects corresponding offers and requests from other network entities until an end of a defined period before starting an evaluation via a rating and/or booking engine, and the performance resource shop comprises a managing function that evaluates a corresponding offer or request match from other network entities individually, and decides via a rating and/or booking engine to accept or reject the offer or request.

16. The method according to claim 12, wherein the performance resource management message or the performance resource management information comprise at least one management policy.

17. The method according to claim 12, wherein the performance resource management message includes an identifier identifying the second network entity.

18. The method according to claim 12, further comprising: converting, by the first network entity, between different descriptions of a performance resource.

19. The method according to claim 12, wherein a performance resource is described by at least one of:
frequency,
bandwidth,
spectrum,
transport bandwidth,
broadband wireless best effort service,
available services,
available applications, and
transmission capacity.

20. The method according to claim 12, wherein the performance resource is a communication performance resource.

* * * * *